US012716275B2

(12) United States Patent
Guerin et al.

(10) Patent No.: US 12,716,275 B2
(45) Date of Patent: Aug. 25, 2026

(54) MOTOR VEHICLE EXTERNAL HANDLE CONTROLLED BY A STRAIN GAUGE SENSOR

(71) Applicant: MINEBEA ACCESSSOLUTIONS ITALIA S.P.A., Pianezza (IT)

(72) Inventors: Anthony Guerin, Pianezza (IT); Antonio Rocci, Pianezza (IT); Marco Savant, Pianezza (IT)

(73) Assignee: Minebea AccessSolutions Italia S.p.A., Pianezza (IT)

( * ) Notice: Subject to any disclaimer, the term of this patent is extended or adjusted under 35 U.S.C. 154(b) by 27 days.

(21) Appl. No.: 18/659,593

(22) Filed: May 9, 2024

(65) Prior Publication Data

US 2024/0376756 A1 Nov. 14, 2024

(30) Foreign Application Priority Data

May 9, 2023 (EP) .................................... 23172206

(51) Int. Cl.

*E05B 81/76* (2014.01)
*E05B 85/10* (2014.01)
*G01L 1/00* (2006.01)

(52) U.S. Cl.

CPC .............. *E05B 81/76* (2013.01); *E05B 85/10* (2013.01); *G01L 1/005* (2013.01)

(58) Field of Classification Search

CPC .......... E05B 81/76; E05B 81/77; E05B 85/10; E05B 85/14; E05B 85/16; E05B 85/18; E05B 79/06; G01L 1/005; Y10T 292/57

See application file for complete search history.

(56) References Cited

U.S. PATENT DOCUMENTS

2016/0123045 A1* 5/2016 Bingle .................... E05B 81/04 292/336.3
2017/0260778 A1* 9/2017 Witte ................ G07C 9/00174
2020/0011096 A1 1/2020 Leonardi et al.
2021/0148144 A1* 5/2021 Schatz ................. B60R 25/246

FOREIGN PATENT DOCUMENTS

EP 3088641 A1 11/2016
WO 2001040607 A1 6/2001
WO WO-2023276303 A1 * 1/2023 ............ E05B 85/10

OTHER PUBLICATIONS

Machine translation of WO 2023276303 (Year: 2023).*
European Search Report issued in corresponding EP Application 23172206.7, dated Nov. 13, 2023, 3 pages.

* cited by examiner

*Primary Examiner* — Christine M Mills
*Assistant Examiner* — Christopher F Callahan
(74) *Attorney, Agent, or Firm* — Burris Law, PLLC

(57) ABSTRACT

A vehicle door handle assembly includes a handle body. The handle body is configured to set a lock of the vehicle door to a locked state in response to a push action by a user and to set the lock to an unlocked state in response to a pull action by the user. A pressure sensor disposed in the handle body is configured to detect the push and pull actions on the handle from a rest position of the handle. The pressure sensor is arranged in the handle body to provide a pressure signal representative of a pressure applied to the handle body. The pressure signal is representative of a non-zero pressure value when the handle is in the rest position. The pressure value decreases in response to the handle being submitted to the push action and increases in response to the handle being submitted to the pull action.

9 Claims, 3 Drawing Sheets

Z
X
Y
9
20a
20
19
11
12
1
10

9
Z
X
Y
20
1
12
10

MOTOR VEHICLE EXTERNAL HANDLE CONTROLLED BY A STRAIN GAUGE SENSOR

CROSS-REFERENCE TO RELATED APPLICATIONS

This application claims priority to and the benefit of EP 23172206.7 filed on May 9, 2023. The disclosure of the above application is incorporated herein by reference.

FIELD

The present disclosure relates to a door lock device of a motor vehicle and more particularly to door lock devices comprising an external handle including a pressure sensor for sensing a pressure applied to the handle by a user and controlling locking of the door as a function of this pressure.

BACKGROUND

The statements in this section merely provide background information related to the present disclosure and may not constitute prior art.

Motor vehicles typically include doors, such as side doors and tailgates. Generally, the lock devices of motor vehicle doors comprise an external handle associated to a door of the vehicle, a lock mechanism for locking the door in a closed position and having a lock state and an unlock state and a control device for actuating the lock mechanism between the lock and unlock states as a function of movements applied by the user to the handle.

In some door lock devices for motor vehicles, the pressure sensor is arranged to detect push and pull movements exerted by the user on the handle. When the user pushes the handle (towards the interior of the vehicle) the control device sets the lock mechanism in its lock state for locking the door. Reversely, when the user pulls the handle (towards the exterior of the vehicle) the control device sets the lock mechanism to the unlock state for permitting the door to be opened.

Generally the pressure sensor is prestressed such that when the user pulls the handle, the pressure sensed by the pressure sensor decreases, and when the user pushes the handle this pressure increases.

However, the prestressed condition of the pressure sensor can be lost if the handle undergoes a deformation. In this situation, the pressure sensor may no longer detect a pull movement and as a result the door may no longer be unlocked.

Thus, there is a need for improving robustness of a door lock device and its associated door handle.

SUMMARY

This section provides a general summary of the disclosure and is not a comprehensive disclosure of its full scope or all of its features.

The present disclosure is related to a vehicle door handle comprising: a handle body to be coupled to a vehicle door, the handle body being configured to be pushed by a user for setting a lock mechanism of the vehicle door to a locked state and pulled by the user for setting the lock mechanism to an un locked state, a pressure sensor arranged in the handle body to detect push and pull actions of the user on the handle from a rest position of the handle, wherein the pressure sensor is arranged in the handle body to provide a pressure signal representative of a pressure applied to the handle body, the pressure signal being representative of a non-zero pressure value when the handle is in the rest position, the pressure value decreasing when the handle is submitted to a push action and increasing when the handle is submitted to a pull action.

In this manner, the pressure sensor is submitted to a prestressed condition, such that the pressure value provided by the pressure sensor greater than zero when the handle is in its rest position and not submitted to a push or pull action from the user. If this prestressed condition disappears for example due to a shock received by the handle, a pull action can still be detected since it increases the pressure applied to the pressure sensor. Therefore the lock mechanism can still be set to its unlock state and the vehicle door can still be opened.

According to one form of the present disclosure, the door handle further comprises a flexible blade having a U-shaped section and comprising first and second legs linked by a base, the second leg being configured to be directly or indirectly coupled to the vehicle door, the first leg having an internal face facing the first leg, the internal face of the second leg applying a pressure to the pressure sensor when the handle is in the rest position, the pressure applied by the blade to the pressure sensor decreasing when the handle is submitted to a push action and increasing when the handle is submitted to a pull action.

Due to such a U-shaped blade and the arrangement of the blade in the handle with regard to the pressure sensor, a pull action on the handle increases the pressure applied to the pressure sensor.

According to one form of the present disclosure, the pressure sensor comprises a flexible plate that is maintained bent by the blade when the handle is in the rest position, that is further bent by the blade when the handle is submitted to a pull action, and that is less bent by the blade when the handle is submitted to a push action, the pressure signal provided by the pressure sensor varying as a function of a bending amplitude of the plate.

Due to such a structure, the pressure sensor can provide reliable and sufficiently accurate pressure measurement to allow a reliable control of the door lock mechanism. In addition, as depending to the bending amplitude of the plate when the handle is not subjected to a push or pull action, the prestressed condition of the pressure sensor can be accurately adjusted to allow detection of push and pull actions on the handle.

According to one form of the present disclosure, the pressure sensor comprises at least one strain gauge arranged at end regions of the flexible plate along a longitudinal axis of the plate, ends of the flexible plate being secured to the handle body, the flexible blade bearing on a middle part of the flexible plate.

Strain gauges are particularly reliable to operate under the difficult temperature and humidity conditions prevailing in a vehicle and sufficiently sensitive to detect pressures that can be applied by the user to the handle.

According to one form of the present disclosure, the door handle further comprises a control unit connected to the pressure sensor to receive the pressure signal from the pressure sensor, the control unit being configured to be connected to the lock mechanism to set the lock mechanism in the lock or unlock state as a function of values of the pressure signal.

According to one form of the present disclosure, the control unit is further configured to: compare the pressure signal value to a high threshold value and to set the lock mechanism in the unlock state when the pressure signal reaches a value that is equal to or greater than the high threshold value, and compare the pressure signal value to a low threshold value and to set the lock mechanism in the lock state when the pressure signal value reaches a value that is smaller than the low threshold value.

Some forms of the present disclosure may also relate to a vehicle door comprising: a door handle as above defined, and a lock mechanism controlled by pressures applied by the user on the handle, the lock mechanism being set to a locked state when the handle is submitted to a push action and set to an unlocked state when the handle is submitted to a pull action.

According to one form of the present disclosure, the vehicle door is a side door or a tailgate.

Some forms of the present disclosure may also relate to a motor vehicle comprising at least one door according as above defined.

Some forms of the present disclosure may also relate to a method for controlling a vehicle door lock mechanism, the method comprising: providing a door handle as above defined; acquiring a pressure signal provided by the pressure sensor arranged in the handle for detecting pull and pull actions of a user on the handle; and setting the lock mechanism to a locked state when the handle is submitted to a push action and setting the lock mechanism to an unlocked state when the handle is submitted to a pull action.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

The foregoing and other purposes, features, aspects and advantages of the invention will become apparent from the following detailed description of various forms, given by way of illustration and not limitation, with reference to the accompanying drawings, in which the same reference refer to similar elements or to elements having similar functions, and in which.

Figure 1A:
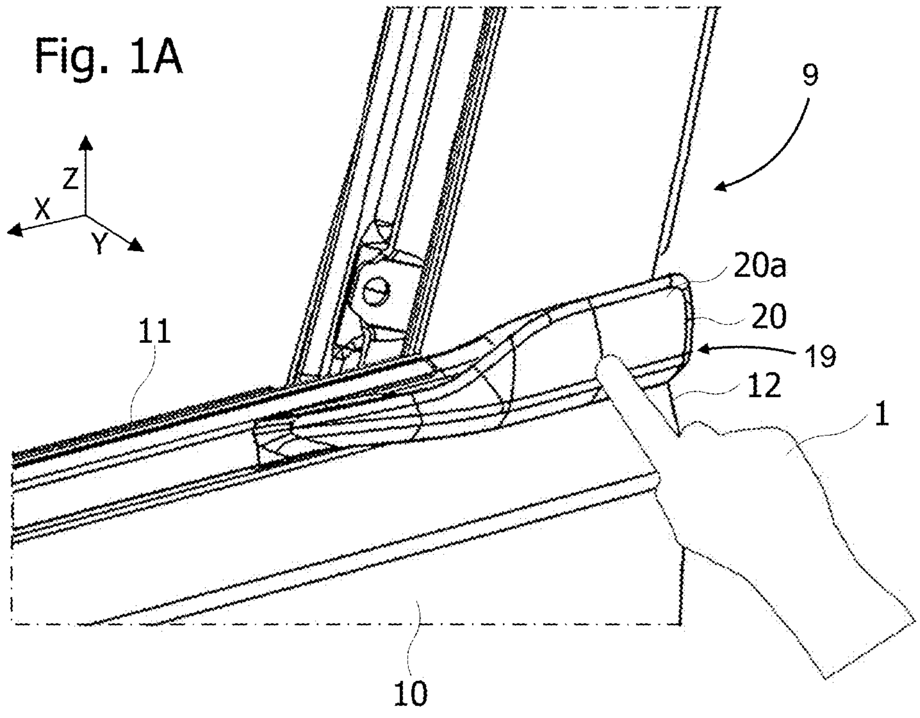
FIGS. 1A and 1B are schematic perspective views of a part of a vehicle door, illustrating a handle assembly of the vehicle door, according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates generally to a handle assembly for a powered lock mechanism of a vehicle door, such as a side door or a tailgate. The handle assembly can include a switch that triggers a powered lock mechanism to lock or unlock the vehicle door.

Figure 1B:
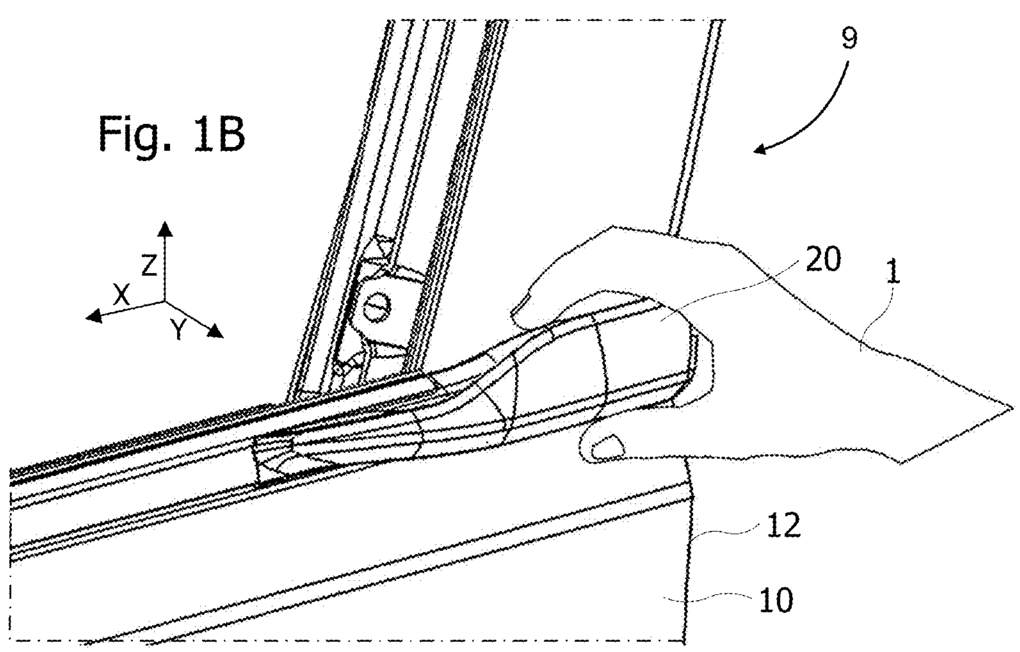

FIGS. 1A and 1B show an external face of a part of a vehicle door 10 of a vehicle 9. The vehicle door 10 comprises a handle assembly 19 that is fixed on an external panel of the door along a lower edge 11 of a door window and along a rear edge 12 of the door panel.

The handle assembly 19 has a handle 20 (also referred to as a handle body) that has an external face 20*a* and an internal face facing the external panel 10, such that the user can exert with their hand 1 either push pressure (FIG. 1A) on the external face 20*a* or pull pressure (FIG. 1B) on the internal face of the handle 20. The door panel 10 extends substantially in a plane defined by a longitudinal axis X of the door panel and an axis Z perpendicular to axis X and a lateral axis Y perpendicular to the door panel.

In the example of FIGS. 1A, 1B, the vehicle door 10 is a left side door. The X axis is a longitudinal axis of the vehicle and oriented from the interior to the front of the vehicle. The Y axis is a lateral axis of the vehicle and oriented from the interior laterally to the exterior of the vehicle and Z axis is oriented upwards.

Figure 2:
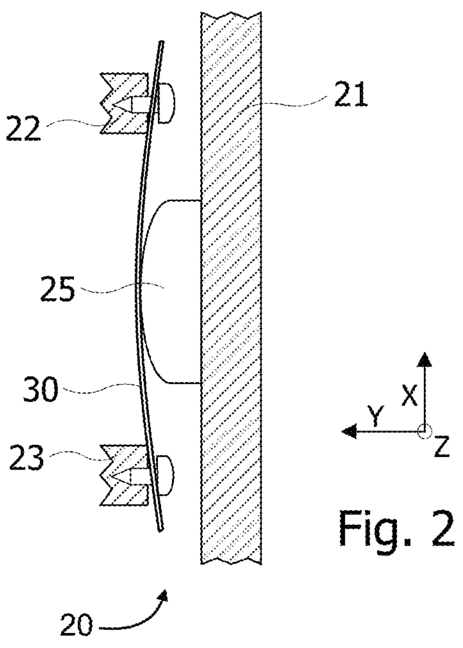
FIG. 2 is a schematic cross-sectional view in an X-Y plane of a part of a handle assembly configured to be coupled to a vehicle door such as the vehicle door of FIGS. 1A and 1B, according to one form of the present disclosure.
Figure 3:
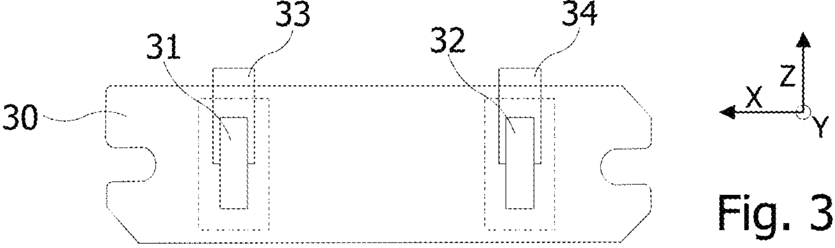
FIG. 3 is a schematic side view of a pressure sensor of the handle assembly of FIG. 1, according to the teachings of the present disclosure.

FIGS. 2 and 3 show a pressure sensor 31, 32 that is fixed on a flexible plate 30, the plate 30 being fixed between a proximal part 21 of the handle 20 and distal parts 22, 23 of the handle 20. Ends of the plate 30 (along axis X) are fixed to the distal parts 22, 23 of the handle whereas a center of the plate 30 bears on a piece 25 fixed to the proximal part 21, such that the plate 30 is elastically deformed (bent) when the handle is in a rest position (as shown in FIG. 2), i.e., when the handle is not submitted to a push or pull action. The pressure sensor 31, 32 provides a pressure signal depending on the deformation of the plate 30. In this manner, the pressure sensor 31, 32 is prestressed by the piece 25 and provides a non-zero pressure signal when the handle is in the rest position.

It should be observed that the proximal part 21 of the handle 20 may be not present. In this case the piece 25 is directly fixed to the door panel 10 or an internal panel of the vehicle door 10.

In the example of FIG. 3, two pressure sensors 31, 32 are fixed on the plate 30 and arranged on the plate to provide a pressure signal varying as a function of a bending amplitude of a longitudinal flexion (along X axis) of the plate. The pressure sensor 31, 32 comprises electrical contacts 33, 34 to provide the pressure signal. According to an example, the pressure sensor 31, 32 are of the type known as a strain gauge having a resistance varying as a function of a deformation applied to the strain gauge. The strain gauges 31, 32 can be connected as resistances within a Wheatstone bridge providing a voltage varying as a function of the resistances of the strain gauges 31, 32.

Due to the arrangement shown in FIG. 2, when the user 1 pushes the handle 20 (in the negative Y axis direction) to lock the door 10, the distal parts 22, 23 move relative to the proximal part 21 in the negative Y axis direction and the plate 30 becomes more deformed from the rest position shown in FIG. 2 and the pressure signals provided by the pressure sensors 31, 32 indicate an increase of the pressure. When the user 1 pulls the handle 20 (in the positive Y axis direction) to unlock the door 10, the distal parts 22, 23 move relative to the proximal part 21 in the positive Y axis direction and the plate 30 becomes less deformed from the rest position shown in FIG. 2 and the pressure signals provided by the pressure sensors 31, 32 indicate a decrease of the pressure.

However, this arrangement is not satisfactory since the prestressed condition of the pressure sensor 31, 32, i.e., of the plate 30 can disappear due to a permanent deformation of the handle 20, for example due to a shock received by the handle 20. If the plate 30 is no more deformed by the piece 25 in the rest position of the handle, the plate 30 remains not deformed when the user 1 pulls the handle 20. In this situation, the pressure signal provided by the sensor 31, 32 does not vary when the user 1 pulls the handle 20 from the rest position. As a result, the door may no longer be unlocked and the user 1 may no longer be able to open the door 10.

Figure 4:
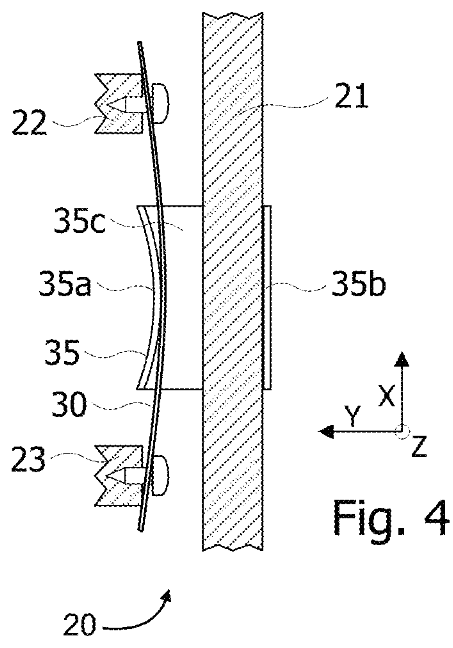
FIG. 4 is a schematic cross-sectional view in the X-Y plane of a part of a handle assembly configured to be coupled to a vehicle door such as the vehicle door of FIGS. 1A and 1B, according to another form of the present disclosure.

FIG. 4 shows the plate 30 with its ends fixed to the distal parts 22, 23 of the handle 20 and the proximal part 21 of the handle 20. According to a form of the present disclosure, the plate 30 is arranged in the handle 20 with its longitudinal axis along X axis and is deformed in the positive direction of the Y axis by a U-shaped blade 35 having a fixed leg 35*b* fixed to the proximal part 21 and a free leg 35*a* having an internal face (facing the leg 35*b*) bearing on the plate 30 to maintain it bent in the axis Y direction when the handle is in the rest position. With this arrangement, when the user 1 pushes the handle 20 (in the negative direction of the Y axis) to lock the door, the distal parts 22, 23 move relative to the proximal part 21 in the negative Y axis direction and the plate 30 becomes less deformed from the rest position shown in FIG. 4 and the pressure signals provided by the pressure sensors 31, 32 indicate a decrease of the pressure. When the user 1 pulls the handle 20 (in the positive Y axis direction) to unlock the door, the distal parts 22, 23 move relative to the proximal part 21 in the positive Y axis direction and the plate 30 becomes more deformed from the rest position shown in FIG. 4 and the pressure signals provided by the pressure sensors 31, 32 indicate an increase of the pressure.

Figure 5:
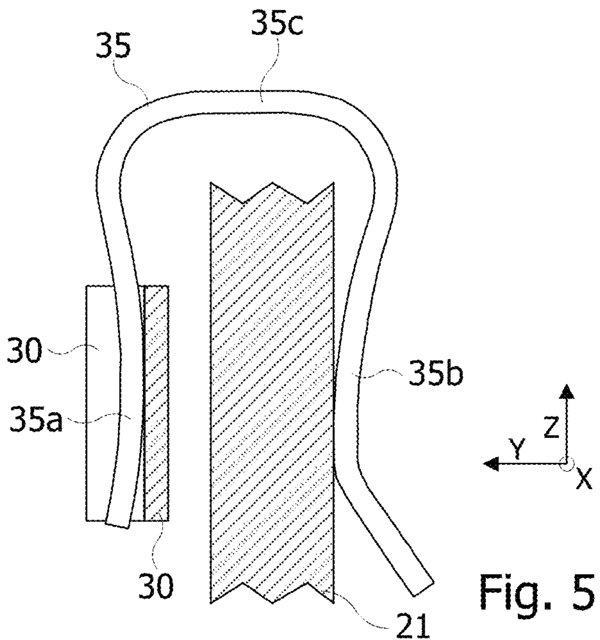
FIG. 5 is a schematic cross-sectional view in a Y-Z plane of a part of a handle assembly, according to a form of the present disclosure.

FIG. 5 shows the plate 30, the proximal part 21 and the U-shaped blade 35 comprising the two legs 35*a*, 35*b* and a base part 35*c* linking the two legs.

Figure 6:
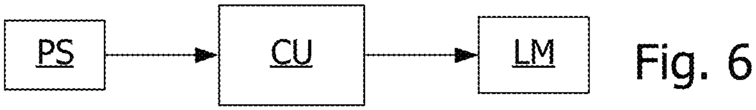
FIG. 6 is a block diagram schematically illustrating circuits controlling locking of the vehicle door of FIGS. 1A and 1B, according to the present disclosure.
Figure 7:
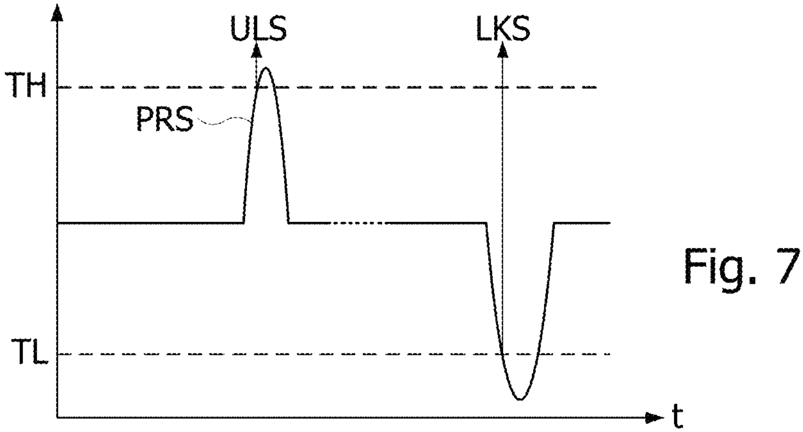
FIG. 7 shows variations of a pressure signal provided by a pressure sensor as a function of time.

FIG. 6 shows a control unit CU connected to a lock mechanism LM of the door 10 and to a pressure sensor PS, for example a Wheatstone bridge integrating the strain gauges 31, 32. FIG. 7 shows variations of the pressure signal PRS as a function of time. The control unit CU is configured to set the lock mechanism LM to a lock state LKS when the pressure signal provided by the pressure sensor PS reaches a low threshold value TL or a value smaller than the low threshold value. The control unit CU is further configured to set the lock mechanism LM to an unlock state ULS when the pressure signal PRS provided by the pressure sensor PS reaches a high threshold value TH or a value greater than the high threshold value. The setting of the mechanism LM to the unlock state ULS can be subjected to another condition such as an authentication of person attempting to unlock the door 10. Such an authentication can be performed for example using a RFID tag storing authentication data, the door 10 being unlocked by the control unit CU only after a detection and authentication of the tag.

According to one form of the present disclosure, the control unit CU can control the lock mechanisms of all the doors and the tailgate of the vehicle. When a push or pull action is detected on the handle 20 of one of the doors or tailgate of the vehicle, the control unit CU can set the lock mechanisms (e.g., LM) of all the doors and tailgate to their lock, and respectively, unlock states.

Due to the arrangement of FIGS. 4 and 5, if the handle 20 undergoes a permanent deformation that leaves the plate 30 in a non-deformed configuration, the door 10 can still be unlocked since the corresponding control movement required from the user 1 increases the deformation of the plate 30. Therefore, the user 1 can still enter and use their vehicle.

According to one form of the present disclosure, the threshold values TH and TL are defined from an average value of the pressure signal PRS when the handle 20 is in the rest position, so as to take into account a variation of the prestressed condition of the plate 30. The average value can be periodically updated.

The above description of various forms is provided for purpose of description to one of ordinary skills in the related art. It is not intended to be exhaustive or to limit the scope of the present disclosure solely to the disclosed forms. Numerous alternatives or variations to the present disclosure will be apparent to those of ordinary skills in the related art. Accordingly, while some alternatives or forms have been presented specifically, other forms will be apparent or easily developed by those of ordinary skills in the related art. Limitations in the appended claims should be interpreted broadly based on the language used in the claims and such limitations should not be restricted to the specific examples described above.

In this respect, it is apparent to those of ordinary skill in the related art that other forms besides the U-shaped elastic blade 35 can be used to prestress the flexible plate 30 such that the pressure provided by the pressure sensor (e.g., PS) decreases when the handle 20 is submitted to a push action and increasing when the handle 20 is submitted to a pull action. Such a form can be implemented for example by a particular shape of the internal structure of the handle 20.

The control unit CU is not necessarily a part of the handle 20 and can be a control unit of the vehicle, and a connector (not shown) can be used to connect the pressure sensor PS to the control unit CU.

The pressure sensor PS does not necessarily comprise strain gauges fixed to a flexible plate. In some forms, another type types of pressure sensor, such as piezoelectric, can be used for detecting a pressure exerted by the internal face of the leg 35*a* of the blade 35.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle door handle assembly comprising:

a handle body configured to be coupled to a vehicle door, the handle body being configured to set a lock mechanism of the vehicle door to a locked state in response to a push action by a user and configured to set the lock mechanism to an unlocked state in response to a pull action by the user; and a pressure sensor arranged in the handle body to detect the push and pull actions by the user on the handle body from a rest position of the handle body, wherein the pressure sensor is arranged in the handle body and comprises a flexible plate that is maintained bent by a blade when the handle body is in the rest position, that is further bent by the blade in response to the handle body being submitted to the pull action, and that is less bent by the blade in response to the handle body being submitted to the push action, the pressure sensor providing a pressure signal that varies as a function of a bending amplitude of the plate and that is representative of a non-zero pressure value when the handle body is in the rest position, the pressure value decreasing when the handle body is submitted to the push action and increasing when the handle body is submitted to the pull action.

2. The vehicle door handle assembly of claim 1, wherein the blade is configured to be flexible, the blade having a U-shaped section and comprising first and second legs linked by a base, the second leg being configured to be directly or indirectly coupled to the vehicle door, the first leg having an internal face facing the second leg, the internal face of the first leg applying a pressure to the pressure sensor when the handle body is in the rest position, the pressure applied by the blade to the pressure sensor decreasing in response to the handle body being submitted to the push action and increasing in response to the handle body being submitted to the pull action.

3. The vehicle door handle assembly of claim 1, wherein the pressure sensor comprises at least one strain gauge arranged at an end region of the flexible plate along a longitudinal axis of the plate, wherein ends of the flexible plate are secured to the handle body, wherein the blade bears on a middle part of the flexible plate.

4. The vehicle door handle assembly of claim 1, further comprising a control unit connected to the pressure sensor to receive the pressure signal from the pressure sensor, the control unit being configured to be connected to the lock mechanism to set the lock mechanism in the lock or unlock state as a function of values of the pressure signal.

5. The vehicle door handle assembly of claim 4, wherein the control unit is further configured to:

compare a value of the pressure signal to a high threshold value and to set the lock mechanism in the unlock state when the value of the pressure signal is equal to or greater than the high threshold value, and compare the value of the pressure signal to a low threshold value and to set the lock mechanism in the lock state when the value of the pressure signal is smaller than the low threshold value.

6. A vehicle door comprising:

the door handle assembly according to claim 1; and the lock mechanism, wherein the lock mechanism is controlled by pressures applied by the user on the handle body, the lock mechanism being set to the locked state in response to the handle body being submitted to the push action and set to the unlocked state in response to the handle body being submitted to the pull action.

7. The vehicle door of claim 6, wherein the vehicle door is a side door or a tailgate.

8. A motor vehicle comprising at least one vehicle door according to claim 6.

9. A method for controlling a vehicle door lock mechanism, the method comprising:

providing the door handle assembly according to claim 1;

acquiring the pressure signal provided by the pressure sensor arranged in the handle body for detecting the push and pull actions of the user on the handle body; and setting the lock mechanism to the locked state in response to the handle body being submitted to the push action and setting the lock mechanism to the unlocked state in response to the handle body being submitted to the pull action.

* * * * *